(12) United States Patent
Eddy et al.

(10) Patent No.: US 8,681,880 B2
(45) Date of Patent: Mar. 25, 2014

(54) ADAPTIVE DITHERING DURING IMAGE PROCESSING

(71) Applicant: Apple Inc., Cupertino, CA (US)

(72) Inventors: Alex Eddy, Sunnyvale, CA (US); Nick Burns, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/669,338

(22) Filed: Nov. 5, 2012

(65) Prior Publication Data

US 2013/0064445 A1    Mar. 14, 2013

Related U.S. Application Data

(62) Division of application No. 12/631,006, filed on Dec. 4, 2009, now abandoned.

(51) Int. Cl.
*H04N 11/02* (2006.01)

(52) U.S. Cl.
USPC .................................................. 375/240.29

(58) Field of Classification Search
USPC .......................... 375/240.01–240.29
See application file for complete search history.

(56) References Cited

U.S. PATENT DOCUMENTS

| | | | | |
|---|---|---|---|---|
| 4,576,286 | A * | 3/1986 | Buckley et al. | 209/558 |
| 4,956,638 | A | 9/1990 | Larky et al. | |
| 5,148,273 | A | 9/1992 | Lippel | |
| 5,184,124 | A | 2/1993 | Molpus et al. | |
| 5,598,514 | A * | 1/1997 | Purcell et al. | 345/418 |
| 5,684,898 | A * | 11/1997 | Brady et al. | 382/282 |
| 6,317,522 | B1 * | 11/2001 | Rackett | 382/268 |
| 6,621,864 | B1 * | 9/2003 | Choo | 375/240.16 |
| 6,665,346 | B1 * | 12/2003 | Lee et al. | 375/240.29 |
| 6,970,602 | B1 * | 11/2005 | Smith et al. | 382/232 |
| 7,580,589 | B2 * | 8/2009 | Bosco et al. | 382/275 |
| 7,899,271 | B1 * | 3/2011 | Williams | 382/284 |
| 8,000,396 | B2 * | 8/2011 | Tomizawa | 375/240.29 |
| 2001/0007452 | A1 * | 7/2001 | Naka et al. | 345/473 |
| 2002/0051496 | A1 * | 5/2002 | Hashimoto | 375/240.27 |

(Continued)

FOREIGN PATENT DOCUMENTS

| KR | 20050050856 A1 | 6/2005 |
|---|---|---|
| WO | 2009005497 A1 | 1/2009 |

OTHER PUBLICATIONS

Conklin. "Dithering 5 Tap Filter for Inloop Debiocking," JVT MPEG Meeting, May 6-10, 2002; Fairfax, VA, US; Joint Video Team of ISO/IEC JTC1/SC29/WG11 and ITU-T SG. 16, No. JVT-C056, May 10, 2002.

(Continued)

*Primary Examiner* — Dave Czekaj
*Assistant Examiner* — Leron Beck
(74) *Attorney, Agent, or Firm* — Wong, Cabello, Lutsch, Rutherford & Brucculeri, LLP

(57) ABSTRACT

Systems and method are provided for adjusting certain pixel values in an image. In an embodiment of the invention, an average pixel value of pixels at given distances from a selected pixel are examined to determine if the pixel is in a high-contrast area. If the pixel is in a smooth color gradient transition area, the pixel value may be adjusted in some embodiments using an additional dither or dither pattern to reduce differences between the pixel values of the selected pixel and the additional average pixel values exceeding the lower threshold.

23 Claims, 9 Drawing Sheets

(56) References Cited

U.S. PATENT DOCUMENTS

| | | | |
|---|---|---|---|
| 2003/0035586 A1* | 2/2003 | Chou et al. | 382/233 |
| 2003/0152146 A1* | 8/2003 | Lin et al. | 375/240.16 |
| 2003/0189980 A1* | 10/2003 | Dvir et al. | 375/240.16 |
| 2003/0219073 A1* | 11/2003 | Lee et al. | 375/240.27 |
| 2005/0025248 A1* | 2/2005 | Johnson et al. | 375/240.24 |
| 2006/0115002 A1* | 6/2006 | Kim et al. | 375/240.29 |
| 2007/0025445 A1* | 2/2007 | Hong | 375/240.16 |
| 2007/0035772 A1 | 2/2007 | Kakutani | |
| 2007/0183496 A1* | 8/2007 | Kadono et al. | 375/240.08 |
| 2007/0229325 A1* | 10/2007 | Yokose et al. | 341/51 |
| 2008/0025390 A1* | 1/2008 | Shi et al. | 375/240.02 |
| 2008/0055652 A1* | 3/2008 | Kim | 358/3.13 |
| 2008/0267516 A1* | 10/2008 | Chang et al. | 382/236 |
| 2009/0086816 A1* | 4/2009 | Leontaris et al. | 375/240.03 |
| 2009/0180555 A1* | 7/2009 | Sun et al. | 375/240.29 |
| 2009/0273716 A1* | 11/2009 | Wu | 348/607 |
| 2009/0278953 A1* | 11/2009 | Velthoven et al. | 348/222.1 |
| 2010/0027686 A1* | 2/2010 | Zuo et al. | 375/240.29 |
| 2010/0226432 A1* | 9/2010 | Wittmann et al. | 375/240.12 |
| 2010/0246689 A1* | 9/2010 | Filippini et al. | 375/240.27 |

OTHER PUBLICATIONS

Mitchell, et al., MPEG Video Compression Standard—Table of Contents, Chapman and Hall, New York, 1996.

ITU-T Recommendation H.263, Video Coding for Low Bit Communication (Jan. 2005).

ITU-T Recommendation H.264, Advanced Video Coding (Mar. 2010).

* cited by examiner

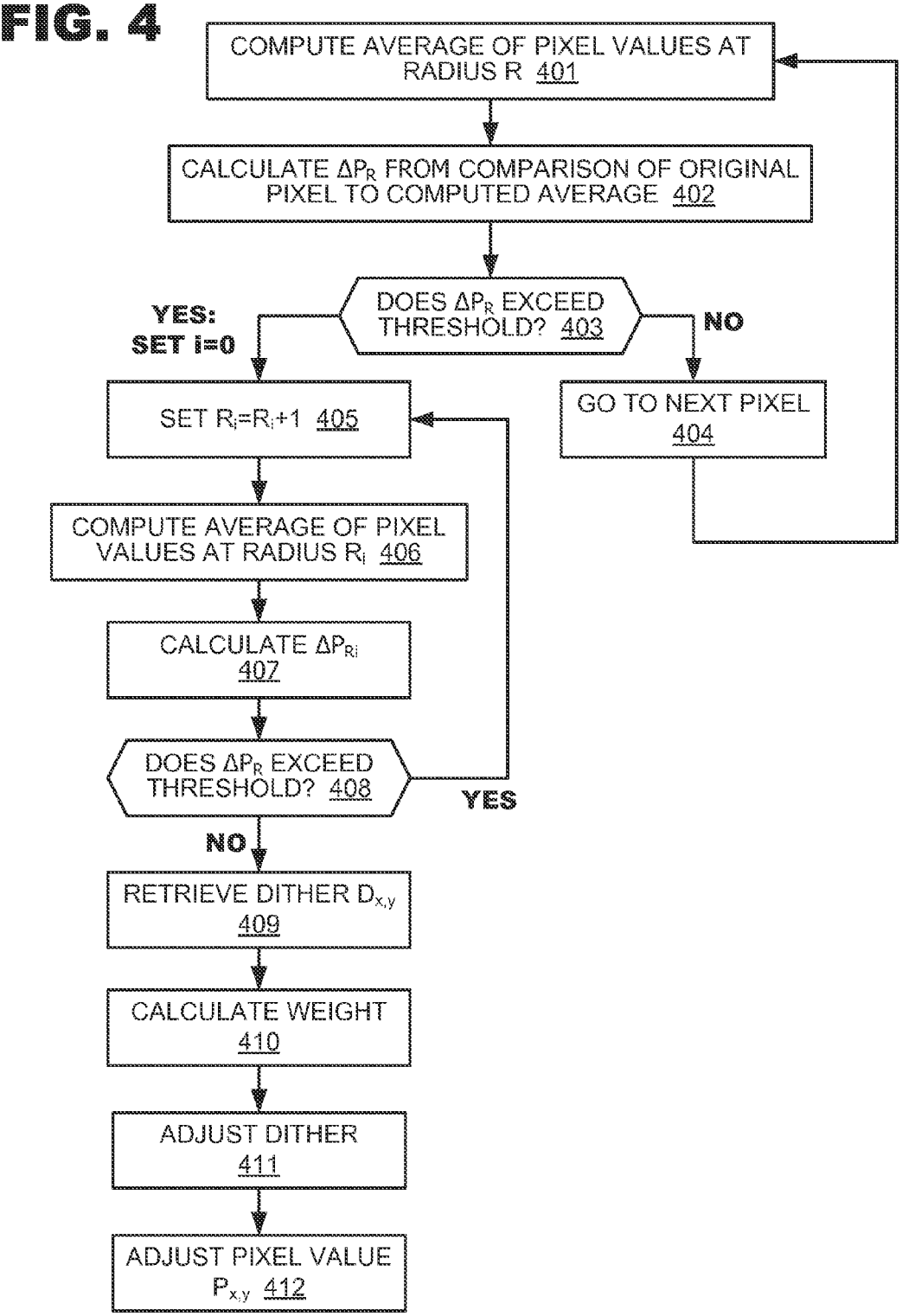

ADAPTIVE DITHERING DURING IMAGE PROCESSING

BACKGROUND

When image data, such as data representing a photograph, picture, or video, is processed electronically by a computing device, the device may not be able to display the original image with complete fidelity. In some instances, artifacts not found in the original image may appear in the electronically-processed image. For example, in some electronically processed images, discrete color bands with various intensities and color levels may appear in lieu of smooth color transition gradients contained in the original image. These banding artifacts may become even more noticeable in resource or bandwidth limited devices. Image processing resources may be determined by various factors including the color space implementation, compression algorithms, and color correction implementation.

Many electronic and computing devices use technologies based on a fixed bit color space implementation which limits the possible number of different colors used. For example, video cards and processors in many digital devices such as computer and video game consoles may be configured to process images in 8 bit, 16 bit, and/or 24 bit RGB color models. In a 16 bit RGB color model there are generally $2^{16}$ or 65,536 different possible colors, typically with $2^5$ or 32 different shades of red and blue, and $2^6$ or 64 different shades of green assignable to each pixel. In a 24 bit color model there may be up to $2^{24}$ or 16,777,216 different possible colors with $2^8$ or 256 different shades of red, green, and blue assignable to each pixel. While having over 16.7 million different possible colors may seem large, the human eye is still able to detect changes from one color to the next.

Many electronic and computing devices also use various lossy image compression techniques to maximize use of image processing resources. Often, these lossy image compression techniques further exacerbate banding artifacts in electronically processed images. Lossy image compression techniques, such as JPEG, MPEG, and H.264, exacerbate banding artifacts by reducing the number of colors in an image to save space. For example, some compression methods examine small pixel blocks in an image and average out different colors in each block using a transform function, such as a discrete cosine transform to even out the color and reduce the total number of colors. By further reducing the number of available colors, the differences between different color shades and transition bands become even more pronounced.

While it may be desirable to reduce banding artifacts in smooth color transition areas of an image, it may also be desirable to maintain definite color transition bands in certain high contrast areas of an image. For example, sections of an image involving contrasting colors, such as those found in an image of an intricate Oriental carpet may contain definite transition bands between the contrasting regions to maintain sharpness and detail. Removing these definite transition bands may result in a loss of detail and a perception of a lower image quality.

Thus, there is a need to reduce banding artifacts in smooth color gradient transition areas of an image while maintaining definite transitions between colors in areas with greater contrast.

BRIEF DESCRIPTION OF THE DRAWINGS

FIG. 4 shows an alternative exemplary method to identify and reduce banding artifacts in an embodiment.

DETAILED DESCRIPTION

In an embodiment of the invention, each pixel may be compared to average values of neighboring pixels at a variety of sampling distances to determine if the pixel is in a smooth gradient area. At each of the given distances, if the difference between the average value of pixels at the distance and the selected pixel is less than a predetermined threshold, it is assumed that the pixel is in a smooth gradient area. When the selected pixel is in a smooth gradient area, the pixel may be modified by a dither effect. A dither effect may be added to image data in smooth gradient areas but may not modify image data in areas of stronger transition. Adding a dither effect in these specified smooth gradient areas may improve the perceived quality of a rendered image.

Figure 1:
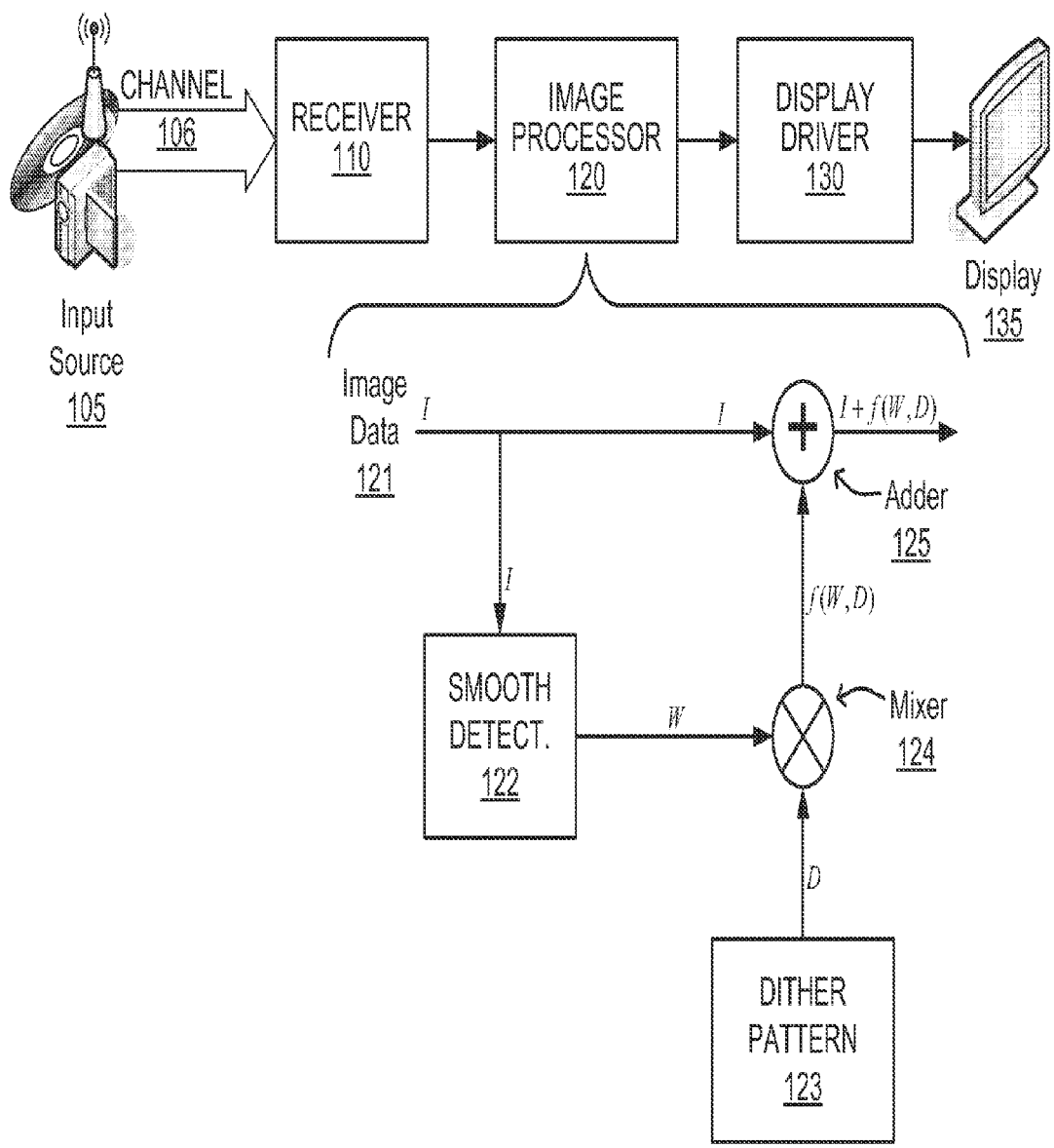
FIG. 1 shows a basic block diagram of an image processing device in an embodiment.

FIG. 1 shows a simplified block diagram of an image processing system 100 in an embodiment. The system 100 may include a receiver 110, an image processor 120 and a display driver 130. The receiver 110 may receive input image data from a channel 106. The channel may be a wired or wireless communication channel provided by a communication network or computer network. Alternatively, the channel 106 may be a direct connection to an input source 105, such as a camera, television, video player, media device, or memory.

The image processor 120 may perform processing functions to condition image data received by the receiver 110 for display. Image processing functions may include video processing and image filtering. In an embodiment, video processing may extract image content from a received data signal and format it for application to the device via the display driver 130. Image filtering may create one or more a new images as a result of processing the pixels of an existing image. In an embodiment, each pixel in an output of filtering process may computed as a function of one or several pixels in the original image, usually located near the location of the output pixel. In an embodiment using filtering, a filter size may refer to a specific distance and the output pixel value of a output pixel may be a calculated average value of all pixels at the specific distance from the output pixel. Other image processing functions may include video decompression operations in the case that a received image signal is coded according to a video compression protocol, such as H.263, H.264 or MPEG. In an embodiment, the image processor further may perform processes to modify image data as discussed herein.

In an embodiment, the display driver 130 may output the processed image to the display 135. In some embodiments the display driver 130 may be customized for a particular display 135 or type of display, with multiple supported display types having different display drivers.

Figure 2:
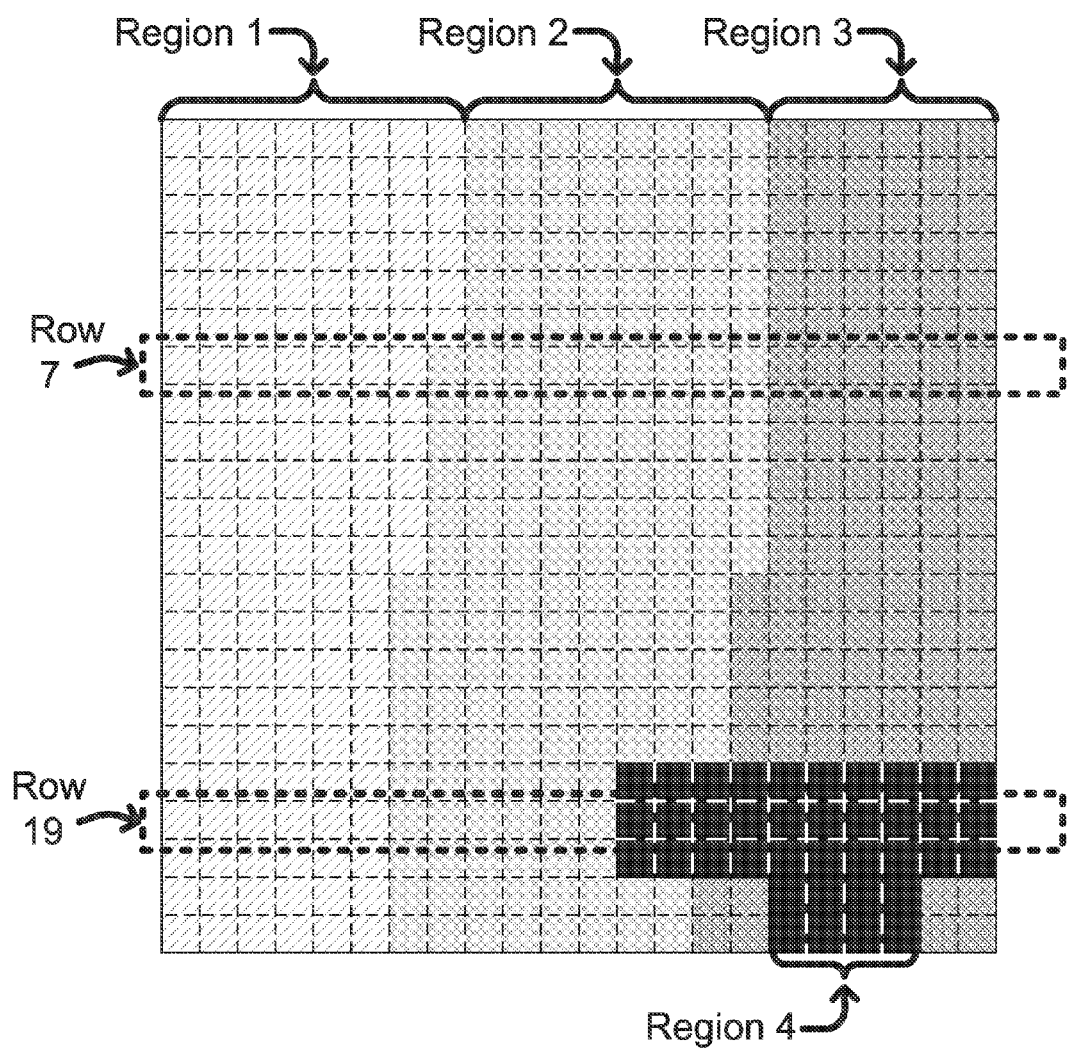
FIG. 2 shows some pixels of an image in an embodiment.

FIG. 2 shows some pixels of an image in an embodiment. Each of the squares shown in FIG. 2 may represent one pixel. The image in FIG. 2 contains four distinct color values broken into four regions: regions 1, 2, 3, and 4, with region 4 have the darkest colors and lower color values, while region 1 has the lightest color with the highest color value, followed by intermediate color regions 2 and 3, respectively. In this embodiment regions 1 and 2, and regions 2 and 3 may be slightly different shades of the same color whereas region 4 may be a dissimilar shade of a different color altogether. The color banding artifacts between regions 1, 2, and 3 are readily apparent as the upper half of image in FIG. 2, such as row 7, is traversed horizontally. While it is possible to adjust the pixel values in this upper portion of FIG. 2, such as in the area around row 7, to reduce banding effects, it may be also desirable to maintain the sharpness of the object in region 4, by not modifying the pixel values in this area.

In an embodiment, the image processor 120 may examine one or more pixels of the image, comparing the color values of each examined pixel to that of its nearby neighbors. During this comparison, the image processor 120 may select pixels for further processing having color values similar to those of its nearest neighbors. Thus, in the exemplary image of FIG. 2, some of the pixels in the upper half of the image near the transition bands between similar color regions 1, 2, and 3, such as in row 7, may likely be selected by the image processor 120. However, the darker pixels in region 4, may not be adjusted by the image processor 120 because of the large variation in pixel values between region 4 and the other neighboring regions.

Figure 3A:
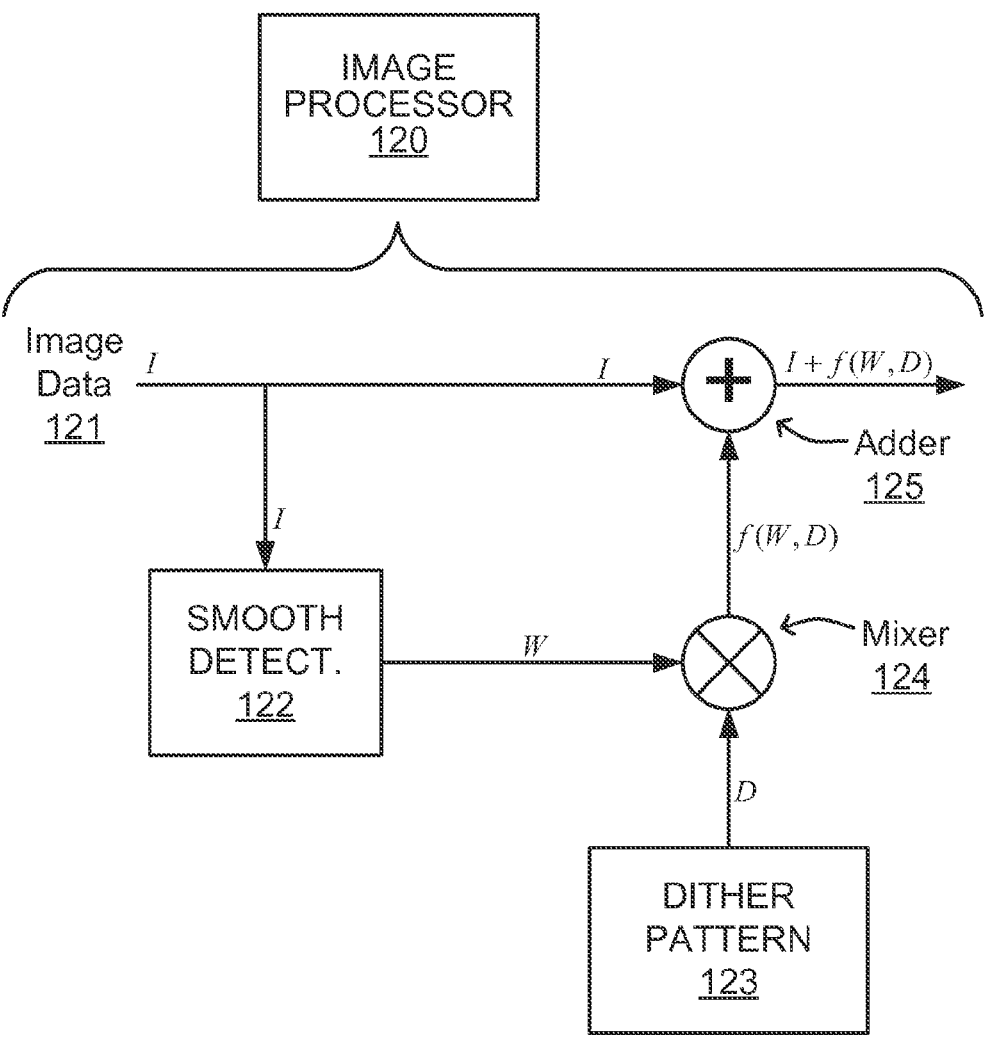
FIG. 3a shows components of an exemplary image processor to identify and reduce banding artifacts in smooth areas of an image in an embodiment.

FIG. 3a shows components of an exemplary image processor 120 to identify and reduce banding artifacts in smooth areas of an image in an embodiment. An image processor 120 may contain a smooth transition detector 122, dither pattern 123, mixer 124, and adder 125. In an embodiment, the smooth transition detector 122 may have an input for input image data 121 ("I") and may filter the image data 121 with different filter sizes to identify pixels at different distances from one or more selected pixels. The smooth transition detector 122 may compare the selected pixels of the input image data I to the filtered image data at different filter sizes and generate a control output ("W") which may be scaled based on a difference between the input image data 121 and the filtered image data when at least one difference is not zero but less than a predetermined threshold.

In an embodiment, both the control output W from the smooth transition detector 122 and a dither pattern 123 ("D") may be inputted to a mixer 124. In an embodiment, the mixer 124 may perform pixel-by-pixel scaling of a dither image pattern D based on a function ("f(D,W)") of the control output W and the dither image pattern D. The mixer 124 may then output the scaled results f(D,W) to an adder 125. In an embodiment, the adder 125 may add the scaled results f(D,W) from the mixer 124 to the original image data I and the image processor 120 may output the results I+f(D,W).

Figure 3B:
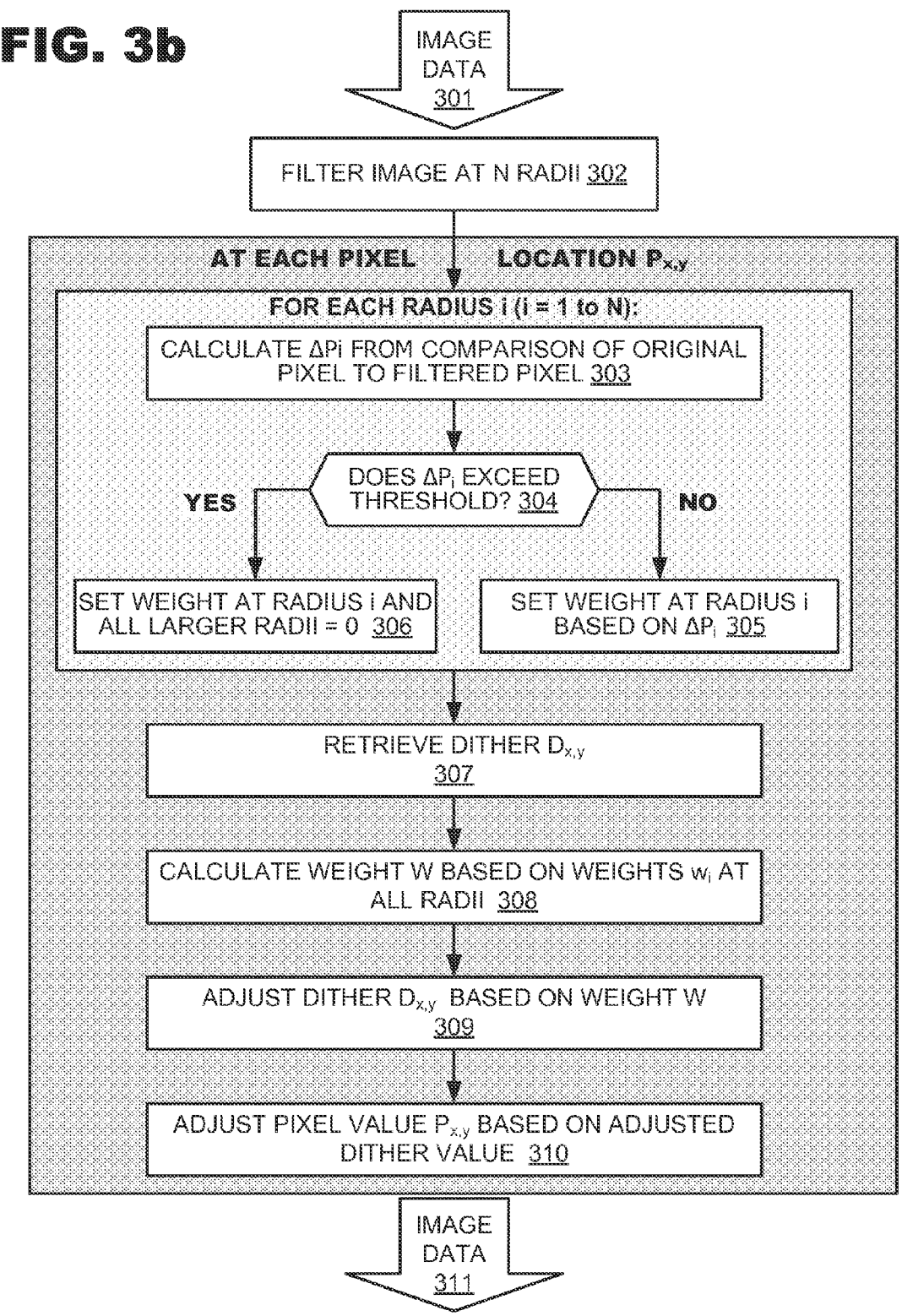
FIG. 3b shows an exemplary method to identify and reduce banding artifacts in smooth areas of an image in an embodiment.

FIG. 3b illustrates an exemplary method to identify and reduce banding artifacts in smooth image data. The method may be started by inputting image data (box 301). The image data input may be filtered multiple times (N times) at different distances from a pixel of interest (box 302). During each of these filtering operations, an average pixel value $\overline{P_i}$ of the filtered pixels at the selected distance i from a given pixel may be calculated.

Once the average pixel values have been calculated at each of the different distances from a given pixel, a difference $\Delta\overline{P_i}$ between the actual value of the given pixel $P_{x,y}$ and the calculated average pixel value at each radius $\overline{P_i}$ may be computed (box 303). The difference may be compared to a specified threshold value (box 304). If the difference $\Delta\overline{P_i}$ does not exceed the threshold, then the weight $w_i$ of the average pixel value difference $\Delta\overline{P_i}$ at radius i may be set based on the value of $\Delta\overline{P_i}$ (box 305), and the process may be repeated for a next larger radius. If the difference $\Delta\overline{P_i}$ exceeds the threshold, then the weight $w_i$ of the average pixel value difference $\Delta\overline{P_i}$ at radius i and all radii larger than i may be set to zero (box 306).

Sometime before or after the weights $w_i$ at each of the different radii have been calculated, a dither value $D_{x,y}$ for the given pixel $P_{x,y}$ be retrieved (box 307). An overall weight factor W may be calculated based on a combination of all the computed weights $w_i$ at different distances from the given pixel $P_{x,y}$ (box 308). The dither value $D_{x,y}$ may be adjusted or scaled based on the overall weight factor W (box 309), such as by multiplying the two values $W*D_{x,y}$. In an embodiment, if the overall weight factor W is determined to be zero, then the pixel value $P_{x,y}$ may not be modified.

The given pixel value $P_{x,y}$ may be modified based on the adjusted dither value, such as by adding or subtracting the adjusted dither value from the given pixel value $P_{x,y}$ (box 310). Finally, the processed image data may be outputted for display (box 311). Some or all of these process may be repeated until each pixel $P_{x,y}$ in the image has been processed. In some embodiments, the processed image data may not be outputted until each pixel $P_{x,y}$ in the image has been processed, whereas in other embodiments, the data for each pixel $P_{x,y}$ may be outputted as soon as it is processed.

FIG. 4 illustrates a second exemplary method to identify and reduce banding artifacts in smooth image data. Once image data has been inputted, an average pixel value $\overline{P_R}$ of the filtered pixels at a distance R from a given pixel may be calculated (box 401), A difference $\Delta\overline{P_R}$ between the actual value of the given pixel $P_{x,y}$ and the calculated average pixel value $\overline{P_R}$ may be computed (box 402). The difference may then be compared to a specified threshold value (box 403).

If the difference $\Delta\overline{P_R}$ exceeds the threshold, then the pixel may be assumed to be in a non-smooth color gradient, such as a high contrast region, and the value of the selected pixel may not be modified (box 404), and the process may repeat with the next pixel (box 401). If the difference does not exceed the threshold, then a first distance $R_1$ from the pixel $P_{x,y}$ may be selected (box 405). The average values of pixels $\overline{P_{R1}}$ at distance $R_1$ from the pixel $P_{x,y}$ may be calculated (box 406). Then, a difference $\Delta\overline{P_{R1}}$ between the actual value of the given pixel $P_{x,y}$ and the calculated average pixel value $\overline{P_{R1}}$ may be computed (box 407). The difference $\Delta\overline{P_{R1}}$ may be compared to a second threshold (box 408).

If the difference $\Delta\overline{P_{R1}}$ is less than the second threshold, the process may repeat after incrementing the distance to a second distance $R_2$ (box 405). If the difference $\Delta\overline{P_{R1}}$ is not less than the second threshold, a dither value $D_{x,y}$ for the given pixel $P_{x,y}$ may be retrieved (box 409). In an embodiment, the average pixel difference $\Delta\overline{P_{R1}}$ for pixels at different distances i from the given pixel $P_{x,y}$ up to the highest incremented distance may be scaled depending on their distance to the given pixel $P_{x,y}$ (box 410). Thus, in an embodiment, an average difference of pixels that are closer to pixel $P_{x,y}$, such as $\Delta\overline{P_{R1}}$, may be weighted more than average pixel differences of pixels located further away. An overall weighting factor W may be calculated based on the weighted distance of each of the average pixel differences $\Delta\overline{P_{R1}}$ to the given pixel $P_{x,y}$.

In an embodiment, the dither value $D_{x,y}$ may be adjusted or scaled based on the overall weight factor W (box 411), such as by multiplying the two values $W*D_{x,y}$. The given pixel value $P_{x,y}$ may be modified based on the adjusted dither value, such as by adding or subtracting the adjusted dither value $W*D_{x,y}$ from the given pixel value $P_{x,y}$ (box 412).

Figure 5:
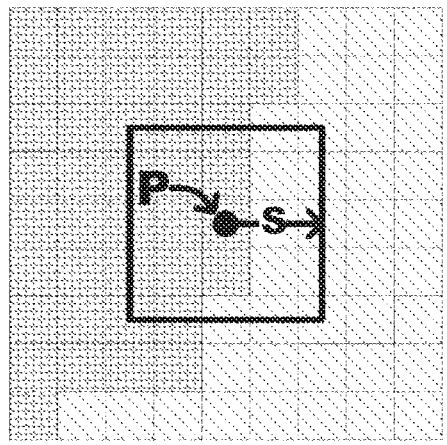
FIG. 5 shows a technique for identifying neighboring pixels in an embodiment.

As discussed previously, the values of neighboring pixels at a specified distance of a pixel $P_{x,y}$ may be considered in an embodiment. The example shown in FIG. 5 shows how neighboring pixels at a specified distance may be identified in an embodiment. In the FIG. 5 example, a distance S of 2 pixels away from the selected pixel P has been chosen. The darkened square box shown in FIG. 5 has sides of length 2S and is centered around the selected pixel P. In an embodiment, the pixels on the perimeter of the square box may be designated as the neighboring pixels of pixel P at a distance S. Other embodiments may use different techniques for identifying nearest neighboring pixels.

For example, some embodiments may identify neighboring pixels using one or more polygons, some of which may have specified distances between one or more vertexes and the center. In other embodiments, a formula for identifying nearest neighbors of a given pixel may vary depending on at least one of the image size, resolution, quality, pixel position, color space, color model, or other criteria. Thus, in some embodiments, it is possible that some pixels in one image may have different nearest neighbor boundaries than other pixels in both the same image and in different images.

Figure 6:
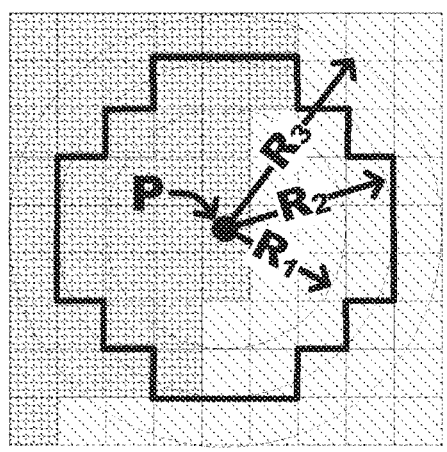
FIG. 6 shows a technique for identifying neighboring pixels at different distances in an embodiment.

In the example shown in FIG. 6, different radii, $R_1$, $R_2$, and $R_3$, may be used to identify pixels in different vicinities of pixel P. Thus, radius $R_1$ may be used to identify closer pixels to pixel P, radius $R_2$ to identify those slightly further out, and so on. In some embodiments, it may be desirable to identify pixels within different neighboring regions, such those within radii $R_1$, $R_2$, and $R_3$, in order to scale the contribution of different pixels depending on their proximity to the pixel P. For example, in some embodiments, it may be desirable to weight the contribution of pixels closer to pixel P, such as those pixels at distance $R_1$, differently from those at different distances, such as those at distances $R_2$ and $R_3$.

Figure 7:
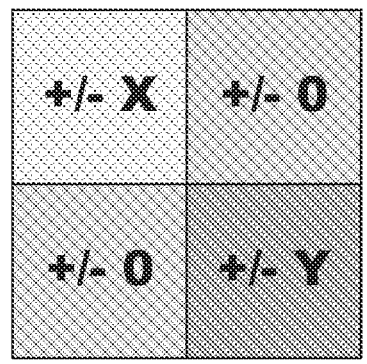
FIG. 7 shows a magnification of an exemplary pixel dither pattern that may be used to reduce banding artifacts in an embodiment.

FIG. 7 shows one example of a repeating dither pattern that may be used in an embodiment to reduce banding artifacts in an image. Other repeating and/or non-repeating dither patterns may be used in different embodiments. In this dither pattern, which is a four square pixel repeating dither pattern (2×2 pixel pattern), the pixels corresponding to the top right and bottom left corners may not be used to adjust pixel values, while those corresponding to the top left and bottom right corners may further adjust the pixel value by some factor X or Y. In an embodiment, this repeating dither pattern may be overlaid on an image to determine which pixels in the image may be adjusted by a factor of X or Y. In an embodiment, pixels in an image that are determined to be adjusted by a factor of X or Y according to the repeating dither pattern may nonetheless not be adjusted if they fail to meet other criteria, such as being located in a high contrast region (non-smooth gradient) or having an average pixel value difference that exceeds a threshold.

In an embodiment, the dither specified in a dither pattern may be applied to a selected pixel based on the location of the pixel in the image relative to the dither pattern. In an embodiment, dither may be applied after a pixel value has been adjusted based on a comparison to the pixel values of surrounding pixels. In an embodiment, the dither pattern may specify different factors (0 for no change, X, Y, etc.) by which the adjusted pixel value is readjusted. In an embodiment, dither patterns may vary depending on at least one of image size, resolution, quality, pixel position, color space, color model, or other criteria. In an embodiment, the dither pattern may vary based on the direction of color gradient changes in an image, so that, for example, if portion of image transition from dark top to light bottom, the dither pattern may transition from dark top to light bottom, and so on.

Figure 8:
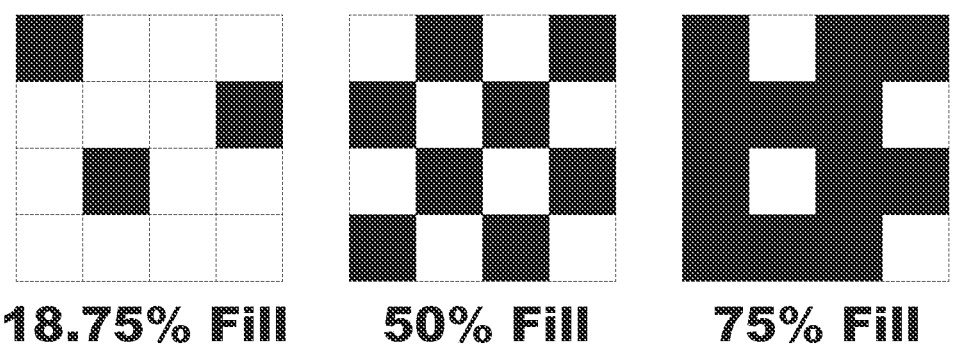
FIG. 8 shows a magnification of exemplary pixel dither patterns that may be used to increase a perceived number of colors in an embodiment.

FIG. 8 shows an exemplary 1 bit color model embodiment in which dither may be used to increase an available color palette. In an 1 bit color model, each pixel is either "on" or "off" resulting in two possible colors. Additional lighter and darker shades of colors between these two pixel states may be simulated by using a repeating dither pattern that only activates a fraction of pixels in a given area, as shown by the 18.75%, 50%, and 75% pixel fill rate blocks. Although FIG. 8 depicts an exemplary 1 bit color model, the same principles can be used in other color models, such as 16-bit or 24-bit RGB color models. Additional lighter or darker "shades" of colors which do not have an assigned numerical color value in a given color model can be simulated using different dither patterns as shown in FIG. 8. Thus, to simulate various shades of a darker color, for example, a region of the image can be filled with a repeating dither pattern having 75% or more of the pixels filled as shown in FIG. 8.

Figure 9:
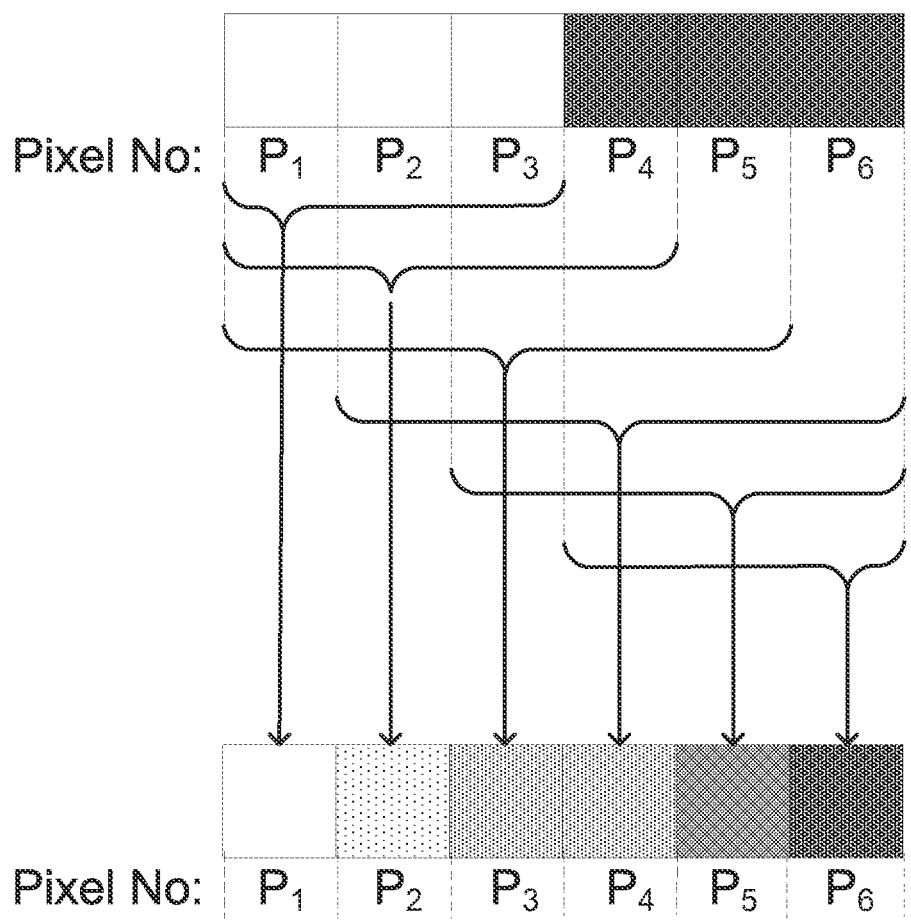
FIG. 9 shows an exemplary use of a blur function to reduce banding artifacts in an embodiment.

FIG. 9 shows a result of averaging pixel values differences in an embodiment to reduce banding and provide a smooth gradient when transitioning between colors in a discrete region. In this example, the value of each pixel may be adjusted based on the difference in pixel value between the selected pixel and its two nearest neighbors in either direction (left or right). The top portion of FIG. 9 shows pixels $P_1$ through $P_6$ before the averaging function is applied; the bottom portion shows the result.

As shown in the upper half of FIG. 9, pixel $P_1$'s two nearest neighbors are $P_2$ and $P_3$. Since the value of all three pixels are equal, as $P_1=P_2=P_3$, no change from the averaging function used in FIG. 9 may result and $P_1$ in the bottom half may not change.

As shown in the upper half of FIG. 9, pixel $P_2$'s two nearest neighbors on either side are $P_1$, $P_3$, and $P_4$. Since two of these pixels have equal values to $P_2$, $P_2=P_1=P_3$, the average of the pixel values may only be affected by the difference of $P_4-P_2$, so the adjusted value $P_2$ may only be slightly darkened as shown in the bottom half of FIG. 9.

As shown in the upper haft of FIG. 9, pixel $P_3$'s two nearest neighbors on either side are $P_1$, $P_2$, $P_4$, and $P_5$. Since two of these pixels have equal values to $P_3$, $P_3=P_1=P_2$, the average of the pixel values may only be affected by the difference of $P_4-P_2$ and $P_5-P_2$ so the adjusted value $P_3$ may be slightly darker than that of $P_2$ as shown in the bottom half of FIG. 9.

As shown in the upper half of FIG. 9, pixel $P_4$'s two nearest neighbors on either side are $P_2$, $P_3$, $P_5$, and $P_6$. Since two of these pixels have equal values to $P_4$, $P_4=P_5=P_6$, the average of the pixel values may only be affected by the difference of $P_4-P_3$ and $P_4-P_2$ so the adjusted value $P_4$ may be about the same or slightly darker than that of $P_3$ as shown in the bottom half of FIG. 9.

As shown in the upper half of FIG. 9, pixel $P_5$'s two nearest neighbors on either side are $P_3$, $P_4$, and $P_6$. Since two of these pixels have equal values to $P_5$, $P_5=P_4=P_6$, the average of the pixel values may only be affected by the difference of $P_5-P_3$, so the adjusted value $P_2$ may only be slightly lighter than the original value of $P_5$ and slighter darker than the adjusted value of $P_4$ as shown in the bottom half of FIG. 9.

As shown in the upper half of FIG. 9, pixel $P_6$'s two nearest neighbors are $P_4$ and $P_5$. Since the value of all three pixels are equal, as $P_6=P_4=P_5$, no change in pixel value may occur and $P_6$ in the bottom half may not change.

Figure 10:
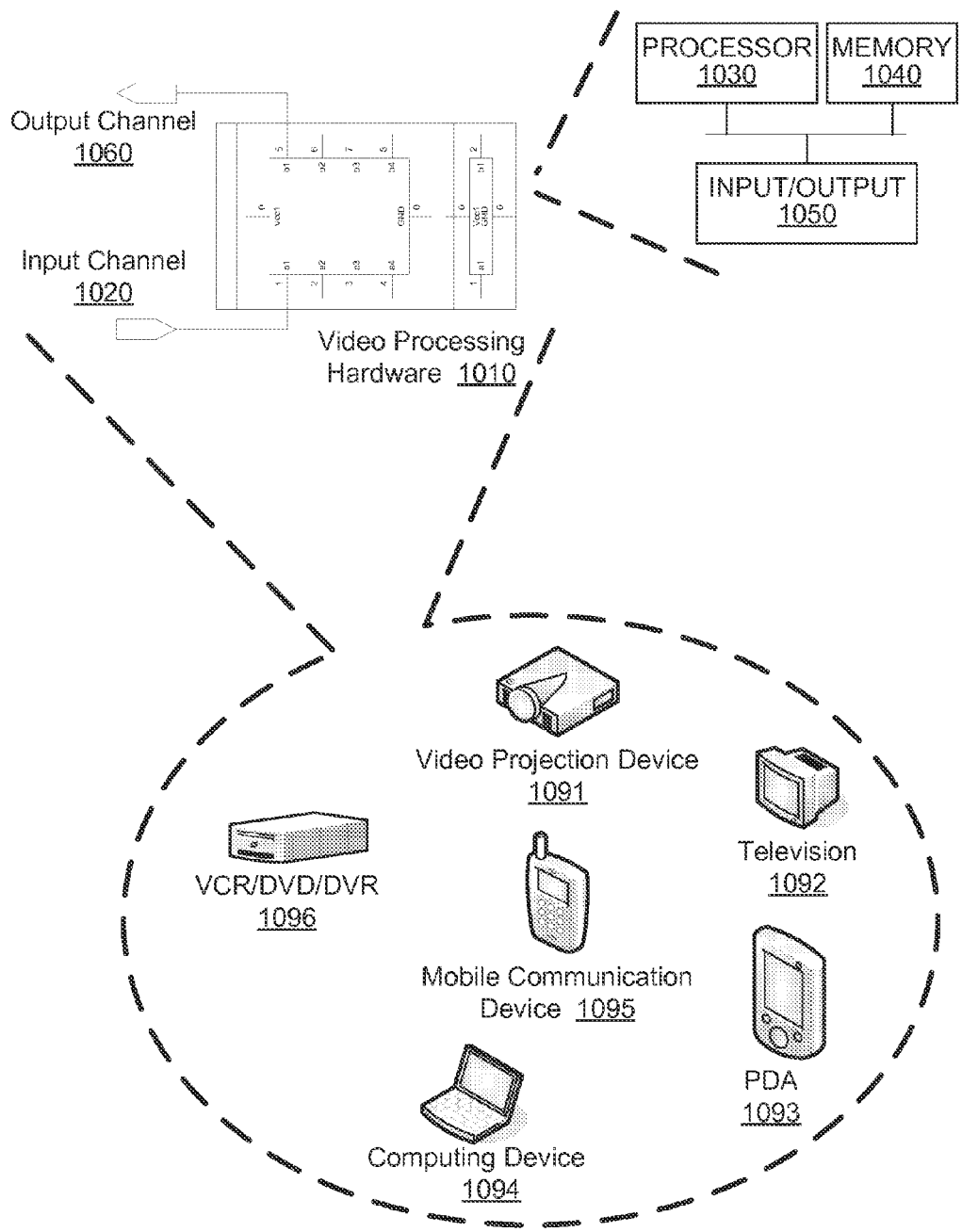
FIG. 10 shows exemplary uses and applications of the invention.

FIG. 10 shows different embodiments of the invention, including different applications and equipment that may be used with the invention. In some embodiments, video processing hardware 1010 may be used to further process images as described in the paragraphs. In an embodiment, the video processing hardware 1010 may include a processor 1030, a memory 1040, and an input/output interface 1050. In an embodiment, a video signal may enter an input channel 1020 of the input/output interface 1050. The video signal may then be processed by a processor 1030, which may calculate new pixel values based on instructions in memory 1040. The new pixel values may then to the output channel 1060 of the input/output interface 1050 to be stored, further processed, or displayed to a user.

In an embodiment, memory 1040 may contain different components for retrieving, presenting, changing, and saving data. Memory 1040 may include a variety of memory devices, for example, Dynamic Random Access Memory (DRAM), Static RAM (SRAM), flash memory, cache memory, and other memory devices. Additionally, for example, memory 1040 and processor(s) 1030 may be distributed across several different components that collectively comprise video processing hardware 1010.

Processor 1030 may perform computation and control functions of a system and comprises a suitable central processing unit (CPU). Processor 1030 may comprise a single integrated circuit, such as a microprocessor, or may comprise any suitable number of integrated circuit devices and/or circuit boards working in cooperation to accomplish the functions of a processor. Processor 1030 may execute computer programs, such as object-oriented computer programs, within memory 1040.

Different variations and embodiments of the video processing hardware 1010 may be included in a variety of devices, including computing, display, and electronics devices. Exemplary computing devices that may contain embodiments of the invention include, but are not limited to, PDAs 1093, smart phones 1095, laptops 1094, desktops, video cards, and other devices. Exemplary display devices that may contain embodiments of the invention include, but are not limited to, televisions 1092, projectors 1091, monitors, LCD/LED screens, and others. Exemplary electronics devices that may contain embodiments of the invention include, but are not limited to, video cassette recorders 1096, digital video disc players 1096, digital video recorders 1096, camcorders, video recording devices, cameras, and others.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention in some embodiments are described as being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

We claim:

1. A non-transitory program storage device comprising instructions stored thereon to cause a processor to:
   obtain a first image;
   select a pixel in the first image, the pixel having an original value;
   filter the first image at a plurality of distances from the selected pixel;
   calculate an average value for the selected pixel at each of the plurality of distances;
   for each of the plurality of distances—
      determine a difference between the average value, at the distance, and the original value,
      set a weight value of the average value at the distance to a value proportional to the difference only when the difference is less than a threshold, and
      set the weight value of the average value, at the distance and all greater distances, to zero only when the difference is greater than or equal to the threshold;
   determine an overall weight value for the selected pixel; and
   change the selected pixel's original value to a new value based, at least in part, on the overall weight value.

2. The non-transitory program storage device of claim 1, further comprising instructions to cause the processor to repeat all instructions for a plurality of pixels in the first image.

3. The non-transitory program storage device of claim 2, wherein the instructions to cause the processor to repeat all instructions for a plurality of pixels in the first image comprise instructions to cause the processor to repeat all instructions for each pixel in the first image.

4. The non-transitory program storage device of claim 1, wherein the instructions to cause the processor to determine an overall weight value comprise instructions to cause the processor to determine an overall weight value that is based, at least in part, on a combination of the weight values at the different distances.

5. The non-transitory program storage device of claim 4, wherein the instructions to cause the processor to determine an overall weight value that is based, at least in part, on a combination of the weight values at the different distances comprise instructions to cause the processor to determine an overall weight value that is based, at least in part, on a combination of all of the weight values at the different distances.

6. The non-transitory program storage device of claim 1, wherein the instructions to cause the one or more processors to determine an overall weight value for the selected pixel further comprise instructions to cause the one or more processors to obtain a dither value for the selected pixel.

7. The non-transitory program storage device of claim 6, wherein the instructions to cause the one or more processors to change the selected pixel's original value to a new value further comprise instructions to cause the one or more processors to change the selected pixel's original value to a new value based, at least in part, on a combination of the overall weight value and the dither value.

8. The non-transitory program storage device of claim 7, wherein the instructions to cause the one or more processors to change the selected pixel's original value to a new value comprise instructions to cause the one or more processors to:
   combine the overall weight value and dither value to generate a scaled dither value; and
   add the scaled dither value to the selected pixel's original value to generate a new value.

9. The non-transitory program storage device of claim 1, wherein the instructions to cause the one or more processors to change the selected pixel's original value to a new value comprise instructions to cause the one or more processors to leave the selected pixel's original value unchanged when the overall weight value is zero.

10. The non-transitory program storage device of claim 6, wherein the instructions to cause the one or more processors to obtain a dither value for the selected pixel comprise instructions to cause the one or more processors to obtain a dither value from a value corresponding to the selected pixel in a dither pattern.

11. The non-transitory program storage device of claim 10, wherein the dither pattern is selected based on, at least, one of: a size, a resolution, a position of the selected pixel, a color space, or a color model of the first image.

12. The non-transitory program storage device of claim 10, wherein the dither pattern comprises a repeating pattern formed by the application of the dither value to a first pixel in the first image and not applying a dither value to a second pixel in the first image.

13. An image processing method, comprising:
    obtaining a first image;
    selecting a pixel in the first image, the pixel having an original value;
    filtering the first image at a plurality of distances from the selected pixel;
    calculating an average value for the selected pixel at each of the plurality of distances;
    for each of the plurality of distances—
        determining a difference between the average value at the distance and the original value,
        setting a weight value of the average value, at the distance, to a value proportional to the difference only when the difference is less than a threshold, and
        setting the weight value of the average value, at the distance and all greater distances, to zero when only the difference is greater than or equal to the threshold;
    determining an overall weight value for the selected pixel; and
    changing the selected pixel's original value to a new value based, at least in part, on the overall weight value.

14. The method of claim 13, further comprising repeating the acts of selecting, filtering, calculating, setting, determining and changing for a plurality of pixels in the first image.

15. The method of claim 14, wherein the act of repeating is performed for all pixels in the first image.

16. The method of claim 13, wherein the act of determining an overall weight value comprises determining an overall weight value that is based, at least in part, on a combination of the weight values at the different distances.

17. The method of claim 13, wherein the act of determining an overall weight value for the selected pixel further comprise obtaining a dither value for the selected pixel.

18. The method of claim 17, wherein the act of changing the selected pixel's original value to a new value comprises changing the selected pixel's original value to a new value based, at least in part, on a combination of the overall weight value and the dither value.

19. The method of claim 18, wherein the act of changing the selected pixel's original value to a new value comprises:
    combining the overall weight value and dither value to generate a scaled dither value; and
    adding the scaled dither value to the selected pixel's original value to generate a new value.

20. The method of claim 17, wherein the act of obtaining a dither value for the selected pixel comprises obtaining a dither value from a value corresponding to the selected pixel in a dither pattern.

21. The method of claim 20, wherein the dither pattern is selected based on, at least, one of: a size, a resolution, a position of the selected pixel, a color space, or a color model of the first image.

22. An electronic device, comprising;
    storage; and
    one or more processors operatively coupled to the storage and configured to execute instructions stored therein to—
        access an image in the storage;
        select a pixel in the image, the pixel having an original value;
        filter the first image at a plurality of distances from the selected pixel;
        calculate an average value for the selected pixel at each of the plurality of distances;
        for each of the plurality of distances—
            determine a difference between the average value, at the distance, and the original value,
            set a weight value of the average value at the distance to a value proportional to the difference only when the difference is less than a threshold, and
            set the weight value of the average value, at the distance and all greater distances, to zero only when the difference is greater than or equal to the threshold;
        determine an overall weight value for the selected pixel; and
        change the selected pixel's original value to a new value based, at least in part, on the overall weight value.

23. The electronic device of claim 22, further comprising a display operatively coupled to the storage and the one or more processors, wherein the one or more processors are operatively coupled to display a version of the image whose pixel values correspond to the changed pixel values.

* * * * *